United States Patent [19]

Orriss

[11] 4,145,578
[45] Mar. 20, 1979

[54] POSITION ACCESS PREFERENCE METHOD

[75] Inventor: Richard A. Orriss, Granville, Ohio

[73] Assignee: Bell Telephone Laboratories, Incorporated, Murray Hill, N.J.

[21] Appl. No.: 900,938

[22] Filed: Apr. 28, 1978

[51] Int. Cl.² .............................................. H04Q 3/64
[52] U.S. Cl. .............................. 179/27 D; 179/27 FF
[58] Field of Search .......... 179/18 D, 18 DA, 27 FF, 179/27 D

[56] References Cited

U.S. PATENT DOCUMENTS

| | | | |
|---|---|---|---|
| 2,874,224 | 2/1959 | Culbertson | 179/18EA |
| 3,299,210 | 1/1967 | Bandy | 179/2 DP |
| 3,341,662 | 9/1967 | Cerny et al. | 179/27 FF |
| 3,413,420 | 11/1968 | Radius et al. | 179/18 DA |
| 4,048,452 | 9/1977 | Oehring et al. | 179/27 D |

Primary Examiner—William C. Cooper
Attorney, Agent, or Firm—Jerry W. Herndon

[57] ABSTRACT

A method is disclosed of preferentially accessing a group of positions (12 in FIG. 1) for a first type of call over a second type of call in a telephone system (FIG. 1) in which the positions (12) are served by a uniform or automatic call distributing office (1). In accordance with one aspect of the invention, selected ones of the positions (12) are marked unavailable for serving calls after the completion of a call of the second type. Thereafter the selected positions are accessed by overriding the unavailable state for a prescribed number of calls of the first type and, at the completion of the prescribed number of calls, the selected positions are again marked available for serving calls. In accordance with a second aspect of the invention, responsive to a first prescribed traffic delay condition in placing calls of the first type to the positions, ones of the positions are successively marked unavailable for serving calls as each completes a call. This occurs as long as the traffic delay state exists. Calls of the first class are placed to the positions that are marked unavailable by overriding the unavailable state. The positions are successively again made available for serving calls as each becomes idle for serving a new call responsive to a second more desirable prescribed traffic delay condition encountered in placing first type calls.

11 Claims, 15 Drawing Figures

FIG. 2 FORMAT OF THE HOTEL RECORD STORE PER HOTEL

FORMAT OF THE BATCH LIST

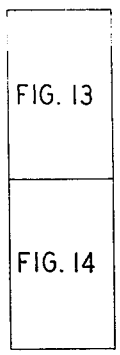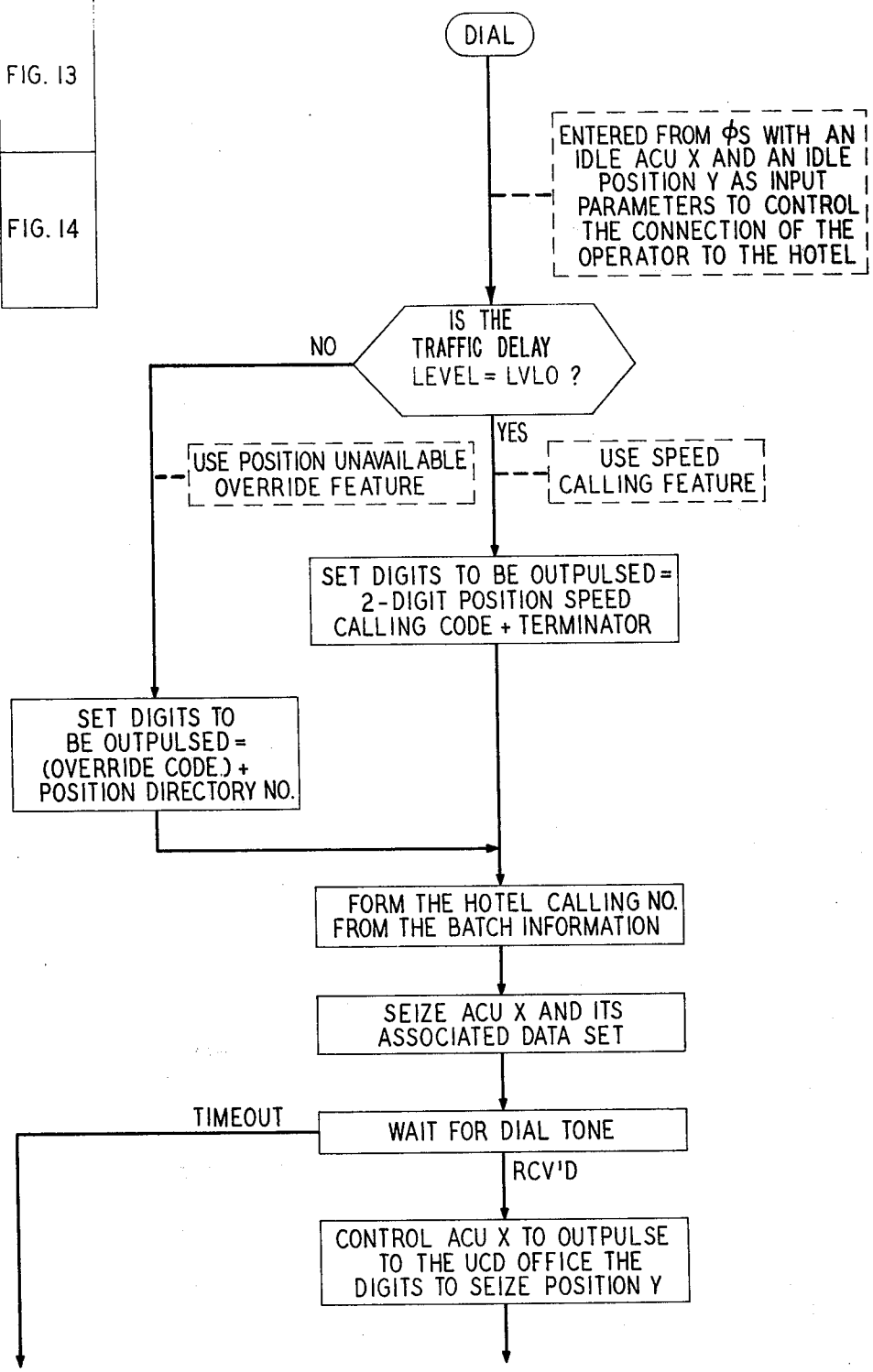

4,145,578

POSITION ACCESS PREFERENCE METHOD

TECHNICAL FIELD

The invention pertains to telephone systems generally, and particularly to arrangements for selectively controlling the accessibility of ones of a group of operator positions to serve different types of calls directed to the positions.

Such a group of operator positions is typically served by an office with multiline hunt group features, including uniform call distribution (UCD) or automatic call distribution (ACD). A multiline hunt group refers to a group of telephone lines or trunks that are individually associated with different stations of a group. The group is assigned a general directory number and the office automatically hunts for an idle line in response to a call to the general directory number. This provides a balanced distribution of calls across the group to each of the stations. Such a group is typically affiliatated with a business or governmental agency and used to serve the needs of the public or customers of the business. For example, an airline reservation bureau typically comprises a plurality of operator positions (stations) which are accessed individually by a multiline hunt office providing ACD or UCD service in response to a group directory number call.

Generally, calls directed to a multiline hunt group are treated alike by the office with respect to access to group stations. That is, no distinction is made between different types of calls placed to the group insofar as hunting for an idle line is concerned. Thus, it is possible that the arrival of large numbers of certain types of calls can result in partially excluding service to other types. For example, large numbers of calls to an airline information and reservation bureau, to inquire about late flights and the like because of inclement weather, might undesirably hinder the completion of calls made for the purpose of establishing reservations.

BACKGROUND ART

In order to alleviate this problem, one form of preferential line hunting has been provided in multiline hunt group offices equipped with ACD and UCD. In this solution, calls made to the general directory number of a first preferred group of lines are permitted to overflow to a second group, whereas calls made to the general directory number of the second group are not permitted to overflow to the first group.

It is also known in connection with the allocation of telephone circuits to provide preferential treatment for certain classes of users under certain predefined conditions. In U.S. Pat. No. 3,413,420 for example, which issued to K. Radius et al. on Nov. 26, 1968, telephone stations are designated as high priority and low priority stations and the station lines appear in the office on different equipment frames in accordance with the respective designations. In the event a predetermined number of connectors in the office become busy, all low priority stations are precluded from completing further calls. This is accomplished by operating circuitry which is responsive only to call signals occurring at the appearances on the high priority frames.

It is also known to reserve telephone circuits under certain conditions to serve a particular type of call. In U.S. Pat. No. 2,874,224 for example, which issued to J. L. Culbertson on Feb. 17, 1959, the idle trunks of a group serving both local and toll traffic are reserved only for toll traffic in the event a prescribed number of the trunks become busy.

Although useful for many applications, the first solution mentioned above is somewhat inflexible. The degree of preferential treatment afforded to calls placed to the preferred group is dependent upon the busy status of the second group. The latter two solutions have the disadvantage that the reservation of circuits of a group for a particular type of traffic bears little or no relationship to the type of traffic actually being served by the group. For example, in the Culbertson teaching, all of the busy trunks may actually be serving toll traffic when the reservation feature is activated. The solution may therefore result in the reservation of the remaining available trunks also for toll traffic to the possible detriment of service to local traffic.

A need therefore exists for a flexible method of controlling multiline hunt group offices to provide preferential station allocation for certain types of calls in accordance with requirements of the individual customers. For example, the above problem exists in an illustrative computerized system used to collect and batch charges for telephone calls made by guests of hotels and motels. A first type of call served by the system is a charge quotation call initiated automatically by the system to seize one of a plurality of operator positions served by a multiline hunt group office and connect the position through the office to an attendant of the hotel or motel to receive a quotation of guest charges. A second type of call served by the system is an inquiry call made, for example, by a hotel attendant to inquire about or correct a previously quoted charge. During periods of office delays or operator overloads which affect the system in performing quotations, a need exists to assign operator positions preferentially to the performing of quotation calls as opposed to inquiry calls.

DISCLOSURE OF THE INVENTION

In one aspect of the invention, the novel method of obtaining preference for one type of call involves the steps of marking an available one of the positions unavailable to the office for receiving calls after the termination of a call of one type to the position and by thereafter accessing the position by overriding the unavailable condition for calls of another type according to a prescribed system traffic delay level. After returning to a desired level of delay, the system again marks the position as available for receiving calls.

In another aspect of the invention, responsive to another prescribed traffic delay level, individual ones of the positions are successively marked as unavailable as they complete calls. The office is then controlled to complete calls of a first type to the positions marked as unavailable by overriding the unavailable states of the positions. When the traffic delays reach a third prescribed level, the positions that have been marked as unavailable are successively made available for serving calls as they become idle.

In one preferred illustrative embodiment, the office is conventionally equipped with position availability control appearances to which in the prior art signals are applied by switches located at a customer's site and controlled by the operators in accordance with which positions are occupied for receiving calls. In accordance with this invention, however, the computerized system maintains its own list of occupied, idle and busy positions and controls the signals on these appearances to control the distribution of quotation and inquiry calls to the operator positions. More specifically, in response to a prescribed system traffic delay level measured by recent delays in performing quotation calls, the system applies an unavailable signal to one of the control appearances associated with a position that has just completed an inquiry call. This makes the position unavailable for calls directed to the general directory number of the position group. In other word, as long as the signal exists the office no longer completes another inquiry call to the position. The system, however, makes use of another feature of the office, conventionally provided for test calls to positions, to complete quotation calls to the position marked unavailable. This office feature is activated by outpulsing to the office the specific directory number assigned to the unavailable position together with an override code. In response the office accesses the specific position even though it is marked unavailable. After the quotation call completes, the system checks traffice delay status and, if it has not reached an increased delay level, the system removes the signal from the control appearance. This makes the position available again to serve either type of call. This control action may be successively repeated with respect to other positions as inquiry and quotation calls are completed so long as the system remains in the prescribed traffic delay level.

In accordance with the second aspect of the invention, in response to a second level of traffic delay, the system successively applies unavailable signals to the control appearances of the positions as they complete calls. These signals are maintained as long as the system remains in the same level of traffic delay to prevent the completion of any inquiry calls to those positions. In the meantime, quotation calls are completed to the positions marked an unavailable by controlling the office as above described. When the system returns to the desired level of traffic delay, the positions marked as unavailable are successively marked as available for serving any type of call as they become idle.

Advantageously, the novel method allows the control of the distribution of different calls types by an office without the incorporation of additional features into the office.

General System Description

Figure 1:
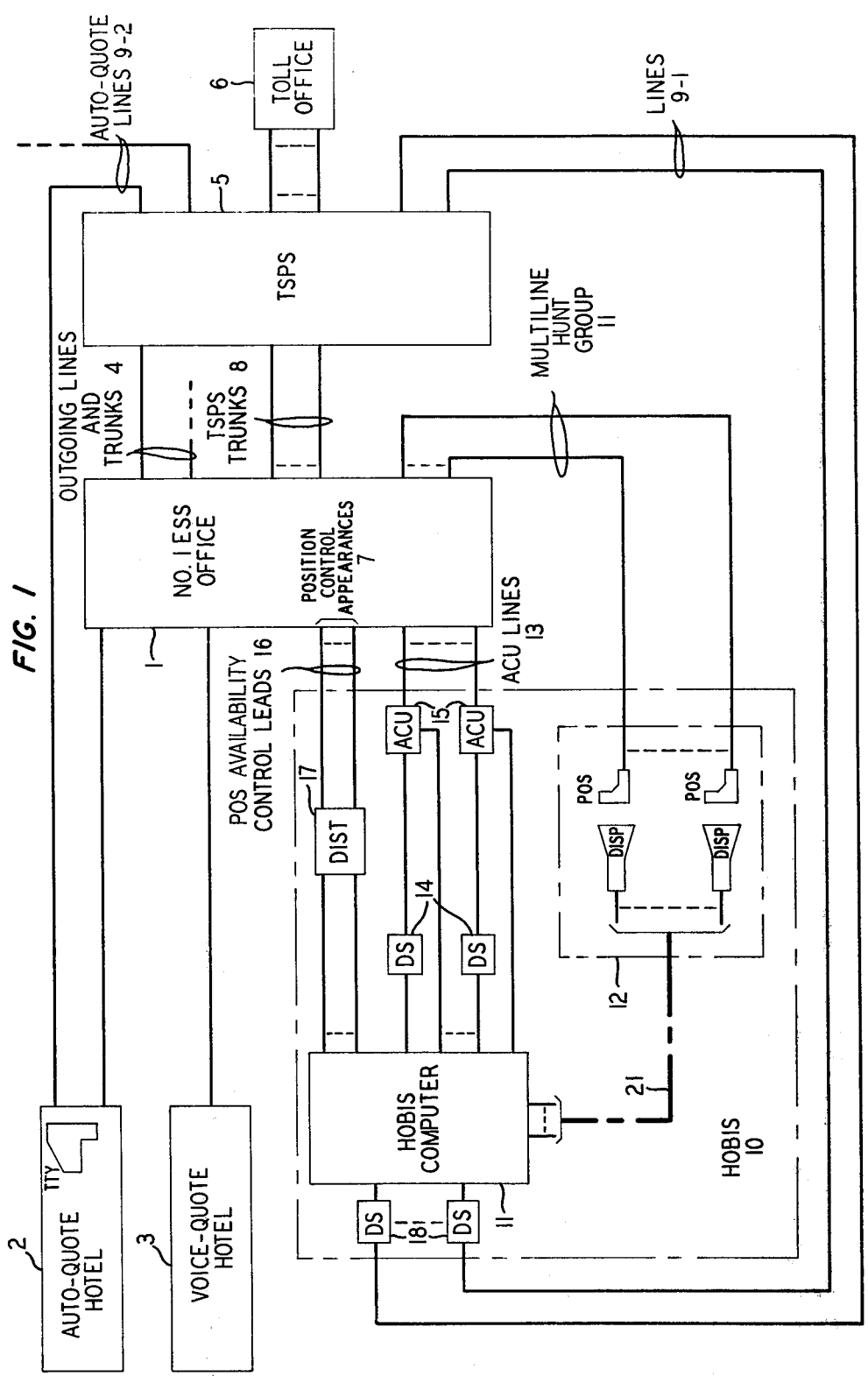
FIG. 1 is a block diagram of a telephone system, including offices and a computer system, arranged to control automatically quotations of telephone charges to hotels and motels for the telephone calls of their guests.

The telephone system of FIG. 1 includes a local switching office 1, illustratively shown as a No. 1 electronic switching system (EGS) manufactured by Western Electric Company, Incorporated, which serves local telephone stations as well as hotels and motels, such as illustrated by hotels 2 and 3. In the remainder of the discussion, the term hotel will be used generically to include hotel, motel and any like entity. Office 1 completes calls to local stations and other telephone offices by means of outgoing lines and trunks 4. Certain types of toll calls are completed by office 1 through the traffic service position system (TSPS) 5 office where automatic message accounting features are provided for accumulating billing charges. Operator positions are provided in TSPS 5 to aid caling subscribers in the completion of special calls such as hotel guest, person-to-person, and the like calls. The No. 1 ESS is discussed in detail in the September, 1964 issue of the *Bell System Technical Journal*. The details of operation of the TSPS is described in U.S. Pat. No. 3,484,560, which issued to R. J. Jaeger, Jr. et al. on Dec. 16, 1969.

TSPS 5 communicates with a toll office 6 to complete toll calls. For hotel guest calls it sends messages, called call records, containing guest charging information to a hotel billing information system (HOBIS) 10 by means of lines 9-1. HOBIS 10 accumulates and batches the records on a per hotel basis for later quoting to hotels such as 3. Hotel 3 is illustratively designated as a voice-quote hotel in FIG. 1 because it receives guest call quotations verbally by a telephone connection with a HOBIS operator. Other hotels, such as 2, are called auto-quote hotels. Auto-quote hotels have a sufficiently large volume of guest call traffic to justify the provision of an on-site TTY on which to receive call records. These auto-quote hotels receive the records directly from TSPS 5 by means of private TTY lines such as 9-2. In addition, the auto-quote records are sent to HOBIS 10 for storage along with voice-quote records to provide a central facility to which inquiries from hotels and guests may be directed. When auto-quote hotels are unable to receive records, as for example when the hotel TTY is inoperative, the auto-quote records from TSPS 5 are labeled as rerouted auto-quote records and are quoted by HOBIS 10 along with voice-quote records.

HOBIS 10 consists of a computer 11, including memory structure (not shown) and a group of operator stations 12. Each station consists of an operator position with a display terminal on which computer 11 displays by means of data link 21 the guest charging information to be quoted to hotels. Illustratively, computer 11 is a PDP 11/70 equipped with a RP05 disk, both supplied by the Digital Equipment Corporation (DEC). The position and display illustratively consist of a Teletype Corporation 40/2 terminal.

Office 1 performs, as a standard feature, uniform distribution of incoming calls over the lines of multiline hunt groups. This feature is described briefly in *Bell Laboratories Record*, Volume 56, Number 3 (March 1958) at page 76. Calls directed to a general directory number associated with such a multiline group are thus automatically and uniformly distributed over the lines of the group. In the system of FIG. 1, the HOBIS positions are individually connected to lines of the multiline hunt group 11 from office 1. As will be seen, this allows calls directed to a general group directory number from hotel attendants and guests relating to inquiries abut specific guest calls to be determined by office 1 to the operators at the HOBIS positions.

Office 1 also completes calls to specific lines of a hunt group in response to the receipt of specific directory numbers identifying particular lines within the hunt group rather than the group general directory number. In accordance with a feature of the invention, HOBIS 10 uses this office 1 feature to access specified ones of its positions according to its own list of occupied, idle and busy positions. Automatic call units (ACU) 15 in conjunction with associated data sets 14 outpulse the specific directory numbers received from computer 11 over lines 13 to cause office 1 to access the desired line of hunt group 11. Illustratively, the 801A ACU and 407A data set, manufactured by Western Electric Company, Incorporated, are used for ACU 15 and data set 14, respectively.

HOBIS 10 is also coupled to office 1 by position availability control leads 16 terminating at control appearances 7 on office 1 and which are individually associated with separate ones of the HOBIS positions 12. As mentioned, in conventional systems these control leads are terminated by keys at a customer site and are used by the customer to notify an office as to which of the hunt group lines are associated with occupied operator positions. In the system of FIG. 1, however, the control leads are connected to a signal distributor 17 in HOBIS 10. Distributor 17 comprises a relay matrix and a controller which receives from computer 11 commands including addresses of individual relays in the matrix and, in response, operates or releases the addressed relays according to the commands. The relays, in turn, directly control the signal states on associated ones of the control leads 16. Virtually any type of well-known signal distributing circuit may be used for distributor 17, such as the signal distributor used in ESS type offices and described in the *Bell System Technical Journal* (September 1964) at page 2255. Computer 11 controls distributor 17 to apply signals to specified ones of the lines 16 to notify office 1 as to which HOBIS positions 12 are occupied and, in accordance with another feature of the invention, to control the availability of the positions for inquiry calls. As will be seen, this allows HOBIS 10 to obtain preferential access for computer 11 quotation calls during periods of service delays and operator overload.

Although in FIG. 1, hotels 2 and 3 and HOBIS 10 are served by the same local switching office 1, it should be understodd that this is entirely for simplifying the drawing. Ordinarily, the hotels could be served by any local office. In calling such a hotel, HOBIS 10 would merely access the serving office by means of office 1 as in any other conventional call.

Briefly the system of FIG. 1 operates as follows. Assuming that a guest at hotel 3 is placing a toll call, office 1 in response to the digits dialed by the guest, seizes one of the outgoing trunks 8 to TSPS 5. TSPS 5 extends the connection to one of its operator positions (not shown) as described in U.S. Pat. No. 3,484,560. The operator verbally communicates with the guest to obtain the guest's name and room number and inserts this information into the control circuits of TSPS 5 by means of position keys. The directory number of hotel 3 is automatically obtained from office 1 by means of its automatic number identification features. TSPS 5 then extends the call to toll office 6 where it is completed to the called station. Upon answer by the called party, TSPS 5 automatically begins call timing operations so that it may later compute the call charges. Thereafter when the call is terminated, TSPS 5 computes the charges for the call and transmits a guest call record by one of lines 9-1 to HOBIS 10.

The record sent to HOBIS 10 contains the directory number of hotel 3, the number of the called party, the guest's hotel room number, the connect time, elapsed minutes of the call and the charges for the call. The HOBIS computer 11 receives the record from one of the data sets 18 and stores it for archival purposes in its memory. In addition, computer 11 batches the record with other call records awaiting quotation to hotel 3. Thereafter, at an appropriate time, computer 11 automatically initiates operations to have quoted to an attendant at hotel 3 all records for hotel 3 that have been received and batched since the last quotation. At the quotation time, computer 11 controls one of ACU's 15 and an associated data set 14 to seize one of the lines 13 and to outpulse to office 1 the specific directory number of one of the HOBIS positions 12 selected in accordance with its own position occupied/idle/busy status list. Office 1, in turn, completes the call to the specified position on the appropriate one of the hunt group lines 11.

The data set 14 places a tone on the line 13, which is heard by the operator upon answer, to identify the call as a quotation call from computer 11. The tone is removed by the data set 14 in response to a signal received on line 13 as a result of a specified key depression by the operator in response to the tone. Computer 11 then controls ACU 15 to send a "flash" signal to office 1 on line 13. In response, office 1 connects a 3-port conference circuit into the connection between computer 11 and the HOBIS operator and again returns dial tone to computer 11. ACU 15 then outpulses the directory number of hotel 3 to office 1 under control of computer 11. Computer 11 disconnects from the line 13 while office 1 completes a connection between the operator and hotel 3. In the meantime, computer 11 displays at the operator display terminal the batched information to be quoted to the hotel. Upon answer by a hotel 3 attendant the quotations are performed by the operator or rebatched by computer 11 under operator control if they cannot be completed. If the connection to hotel 3 is not completed for any reason, the operator may attempt to redial the call using information that is displayed at the display terminal.

As mentioned, to insure preferential access to the positions for quotation calls over inquiry calls during intervals of delay in performing quotations, HOBIS 10 controls signals on the position control leads 16 to make selected ones of the positions temporarily unavailable for serving inquiry calls. HOBIS 10 gains access to positions made unavailable by outpulsing to office 1 the appropriate specific position directory number accompanied by an override code which avoids the unavailable condition in office 1.

By way of example, the control leads 16 are controlled in accordance with three defined HOBIS system traffic delay levels designated as levela 0, 1 and 2. The traffic delay level of HOBIS 10 is determined at any given time by comparing the age of the oldest batch of records scheduled for quoting to a hotel with prescribed time intervals that bear a defined relationship to the service goals of the system in performing quotations. A level 0 occupancy means that no batches are delayed in quotation beyond the system service goals. In level 1, some such delay is being experienced, but is not of such a nature as to affect significantly the service goals. A system occupancy of level 2 on the other hand means that delays are occurring which may significantly affect the intended performance of the system.

Illustratively, one service goal of HOBIS 10 is to quote all records within 10 minutes of their receipt. To accomplish this, the scheduled time of quoting of the first record of a batch is illustratively set to 6 minutes after the time of receipt of the record. With this in mind, level 0 is defined to mean that no batch scheduled for quoting has aged longer than 8 minutes and 45 seconds. In this level, HOBIS computer 11 deactivates all unavailable signals on the control leads 16 associated with occupied positions so that they are accessible for inquiry calls as well as for quotation calls.

Level 2 is defined to mean that some batch scheduled for quoting has aged longer than 9 minutes and 45 seconds or some batch as aged longer than 8 minutes and 45 seconds and the current system occupancy level is already level 2. At this level, position unavailable signals are activated on the control leads 16 at the appropriate times for selected positions. According to a feature of the invention, the positions are made successively unavailable as each completes a task, such as a quotation or inquiry call, without regard to the type of task completed. In level 2, office 1 can complete no inquiry calls to any HOBIS position that has been marked unavailable. The HOBIS computer 11, however, is able to access these positions by appending to the specific position directory numbers the override code previously mentioned.

If the criteria set forth above for determining the occupancy levels 0 and 2 are not met, then the HOBIS occupancy level is set to level 1. Since this level signifies some minimal degree of potential service degradation, it is desired to establish preferential treatment for quotation calls dependent upon the type of tasks being completed by the positions. According to one aspect of this invention, HOBIS 10 accomplishes this by controlling signals on the control leads 16 so that no position can receive more than one inquiry call in succession. In other words, the signals are controlled so that after completing an inquiry call, a position cannot receive another inquiry call until a quotation call is completed. The position may, however, receive successive quotation calls. HOBIS 10 accomplishes this by activating an unavailable signal on the control lead 16 associated with the position at the termination of an inquiry call to the position and by removing the signal at the termination of a quotation call to the position.

Detailed Description

Computer 11 stores records received from TSPS 5 in a portion of its memory referred to as the hotel record store (HRS).

Figure 2:
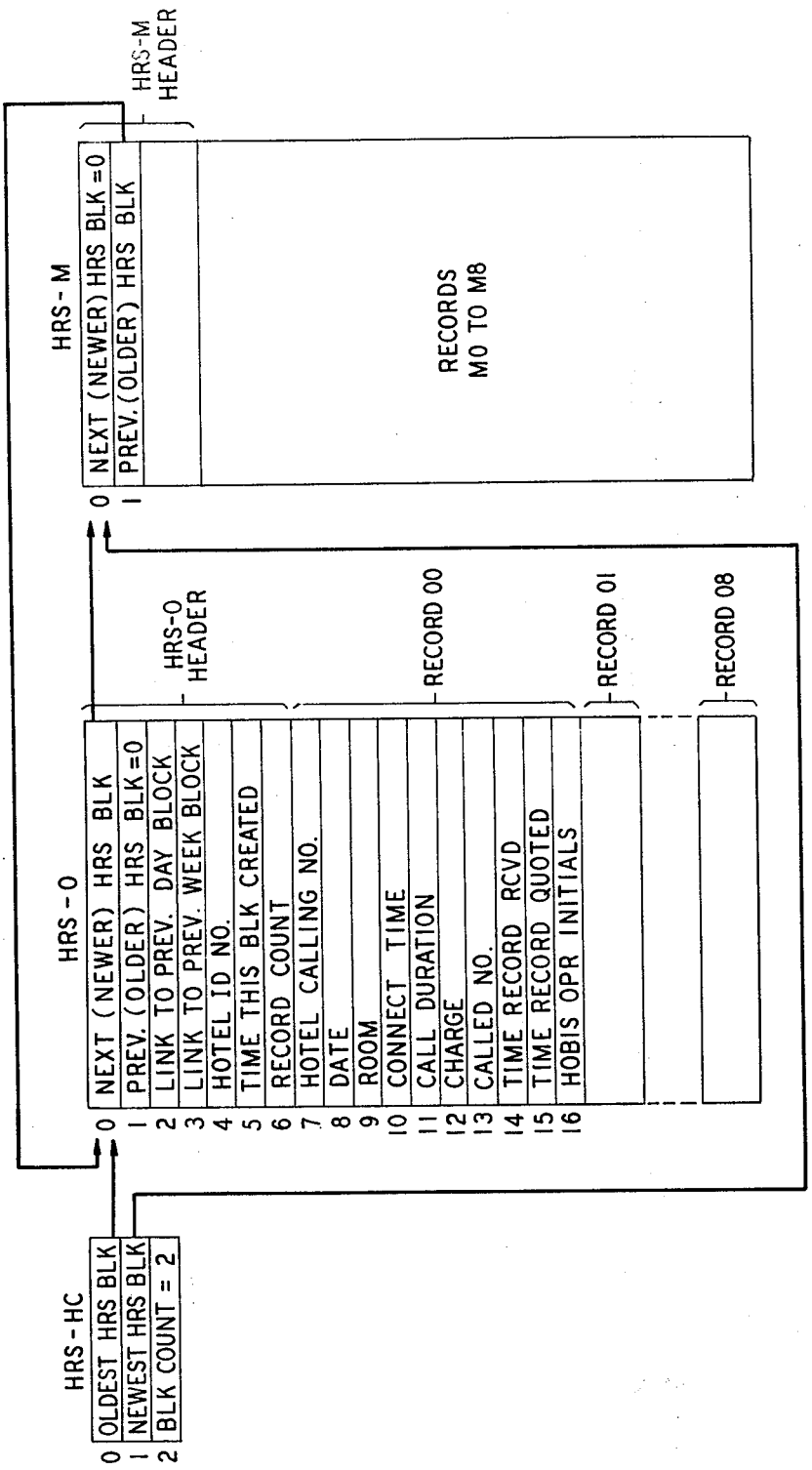
FIGS. 2 and 3 show the organization and layout of memory locations in the computer system.

FIG. 2 illustrates the organization of the HRS. Computer 11 maintains a common pool of HRS memory blocks into which the records are stored as they arrive. A list of these blocks is formed in memory for each hotel served by HOBIS 10 by allocating and linking a new block to the last block associated with a hotel when it becomes full. In the example of FIG. 2, an exemplary list consisting of 2 blocks, HRS-O and HRS-M, is shown for some particular hotel. In HRS-O, for example, each block contains header words 0 to 6 in which is stored preliminary information relating to the block, and 9 multiword record locations 00 to 08 into which the data of 9 records are stored. The older block of this specific example, HRS-O, contains a link address in its first word 0 to the new block HRS-M. This link was formed at the time a record was received from the associated hotel and all record locations in HRS-O were found to be full. At that time, the block HRS-M was allocated from the common pool of blocks and linked to HRS-O and the new record data stored in the first record location 00 of the block.

Each HRS list is of a type commonly called a double-linked list. This means that a second link address stored in word 1 of each block contains an address to the beginning of the previous block in the list. A head cell HRS-HC exists for each hotel HRS list and contains an address pointing to the first (oldest) block in the list, an address pointing to the last (newest) block in the list, and a count of the number of blocks in the list.

In words 2 and 3, respectively, of each HRS block, link addresses are stored pointing to the last block existing at the end of a previous day and to the last block existing at the end of a previous week. This information is used to expedite searching of the HRS blocks in response to an inquiry call from a hotel as to a particular guest call.

A hotel identification number assigned to the hotel associated with the list is stored in word 4. The data stored in the remaining words of the header and in the record locations are self-explanatory from FIG. 2.

Figure 3:
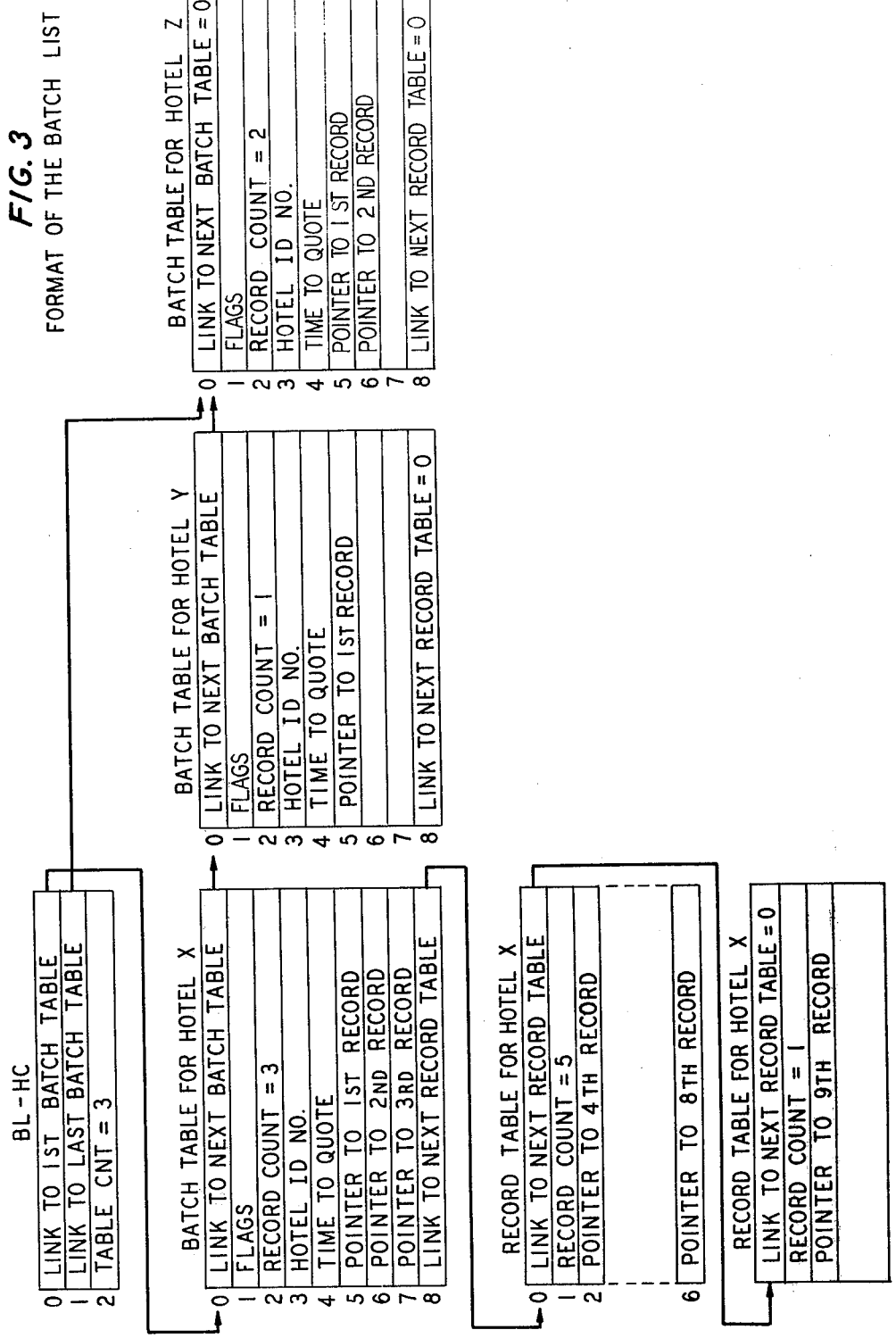

The list of HRS records exist for each hotel, regardless of whether it is auto-quote or voice-quote type. For voice-quote hotels, a batch list is formed as records are received and stored in the hotel's HRS. The batch list is a time-ordered list of batch tables, each of which are associated with a different hotel and contain pointers to records in the HRS scheduled for quoting to a hotel. In addition, each batch table may contain an address linking the batch table to a record table or tables in the event the HRS pointers in the batch table are exhausted. The record table(s) contain additional HRS pointers to records scheduled for quoting to the associated hotel. FIG. 3 shows an exemplary batch list that might exist at any given time in the computer 11 memory. In the example, it is assumed that records are scheduled for quoting to 3 hotels designated as X, Y and Z. Thus 3 batch tables have been allocated from a common pool of batch tables and assigned individually to the hotels X, Y and Z. Word 0 of each batch table contains a link to the next batch table in the batch list. A head cell (BL-HC) contains an address pointing to the first (oldest) batch table (here the table for hotel X) in the list. This is the next batch scheduled for quotation. BL-HC also contains an address pointing to the last batch table in the list and a count of the number of batch tables in the list.

Using the batch table in FIG. 3 for hotel X as an example, each batch table also contains words for storing the hotel identification number, and the scheduled time of performing the quotation. The scheduled time of quotation of the first (oldest) record in the batch determines the scheduled time of quotation of the batch. All records arriving up to the actual quotation time for a particular hotel are quoted at the same time. The batch table also contains pointers to the HRS storage locations of the first 3 records to be quoted. If more than 3 records are batched for quotation to a hotel, record tables are allocated from a common pool and used for storing pointers to 5 additional records in the HRS. The record tables are linked to the batch table by means of the last word in the batch table. Successive record tables, if needed, are linked by means of the first word of each of the record tables. When the quotations are performed, the batch table and record tables are returned to their common pools.

The remaining FIGS contain functional flowcharts of the subroutines that control the operations of HOBIS 10.

Figure 4:
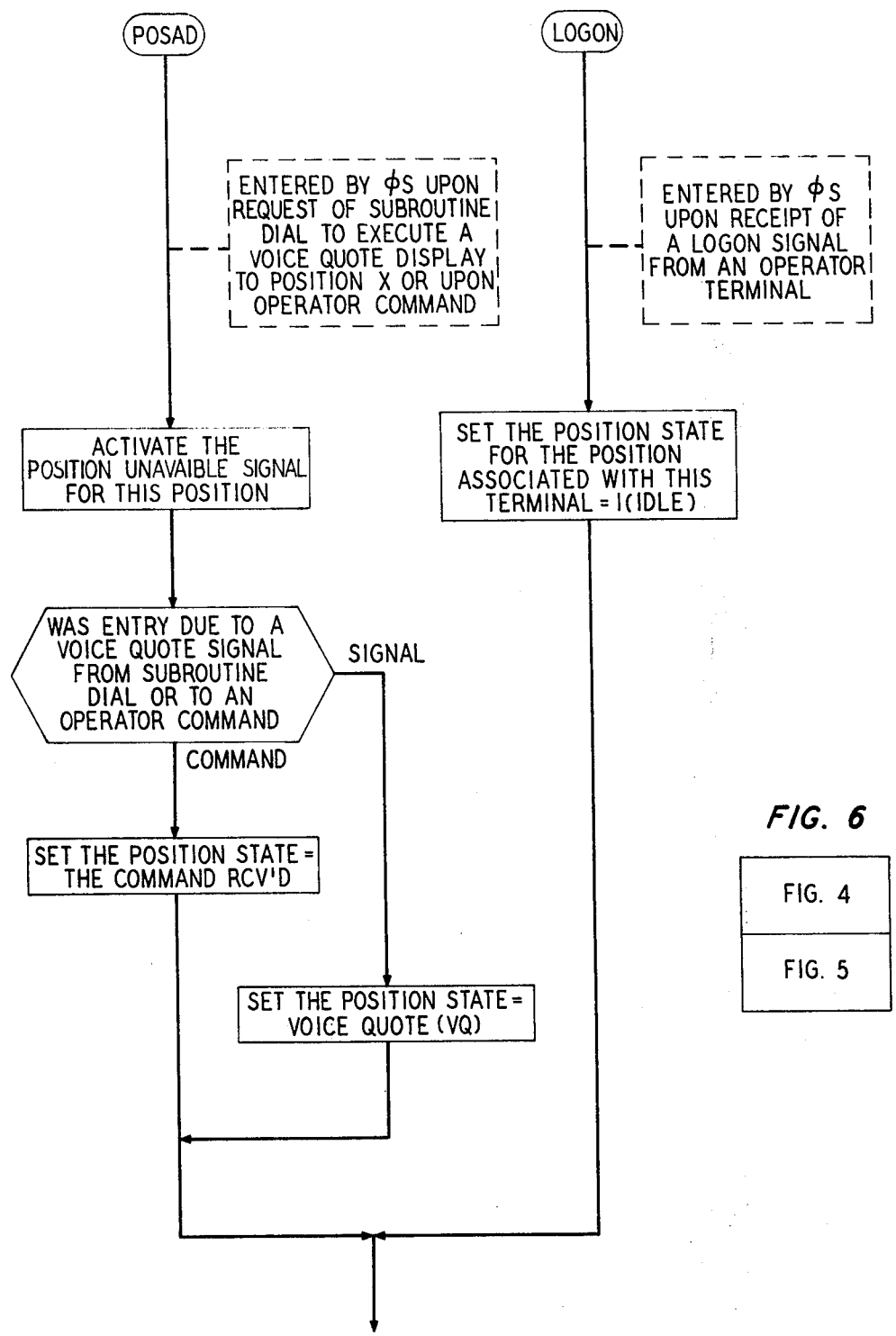
FIGS. 4 and 5, when arranged according to FIG. 6, contain a flowchart of one subroutine of the computer system which controls the occupied, idle and busy states of positions of the computer system.
Figure 6:
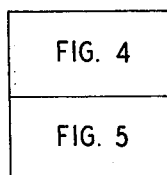
Figure 5:
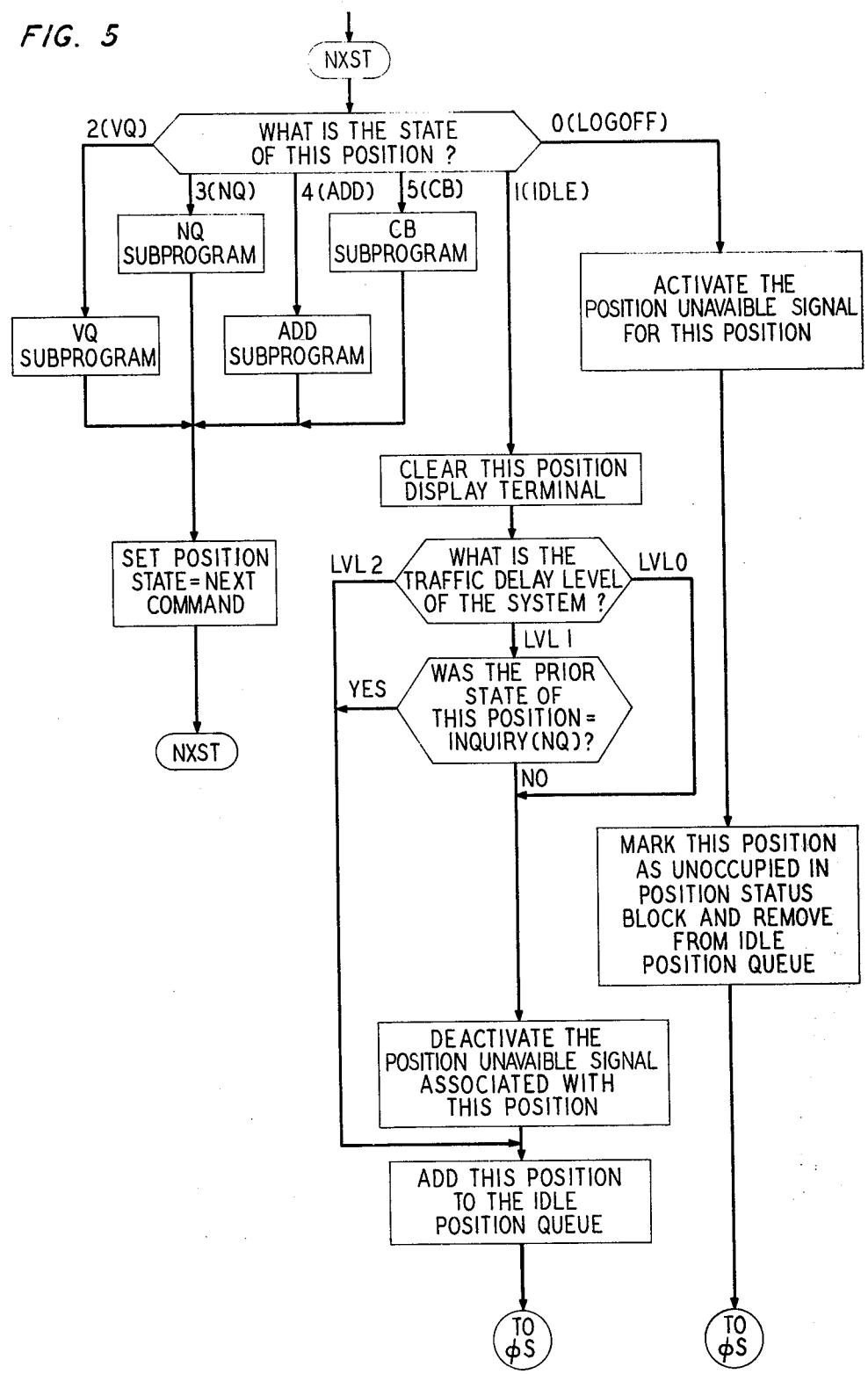

FIGS. 4–6 show two interrelated subroutines LOGON, which is executed when an operator first occupies a HOBIS position, and POSAD, which is executed to control the display of information at an operator display terminal on a quotation call. A common portion of these two subroutines executes subprograms dependent on the states of positions to control communication between the positions and computer 11.

Figure 7:
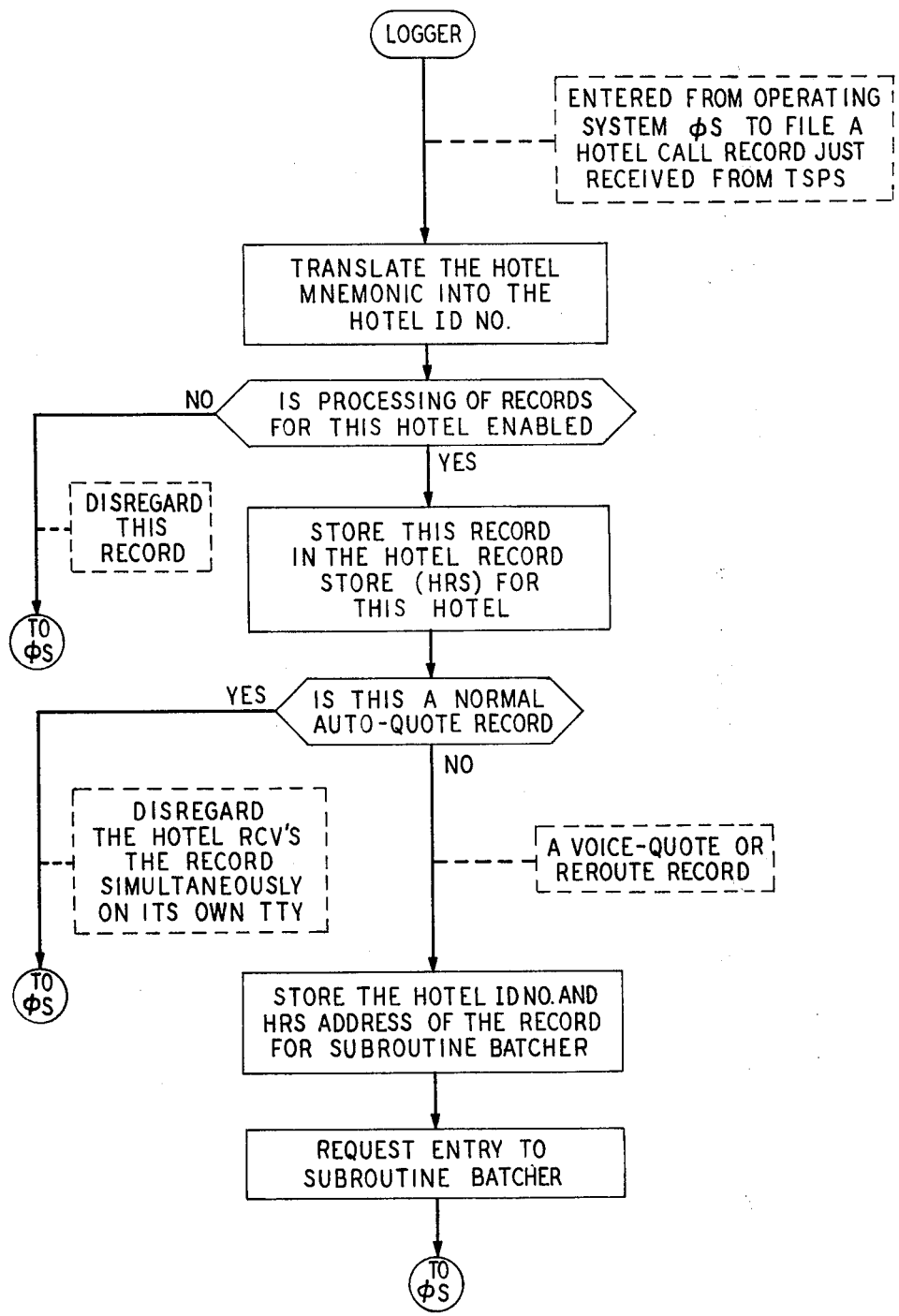
FIGS. 7 through 9, FIGS. 10 and 11 when arranged according to FIG. 12, and FIGS. 13 and 14 when arranged according to FIG. 15, contain flowcharts of additional computer system subroutines that control the storage of guest call charging information, schedule quotation times and automatically call positions and hotels to perform quotations.
Figure 9:
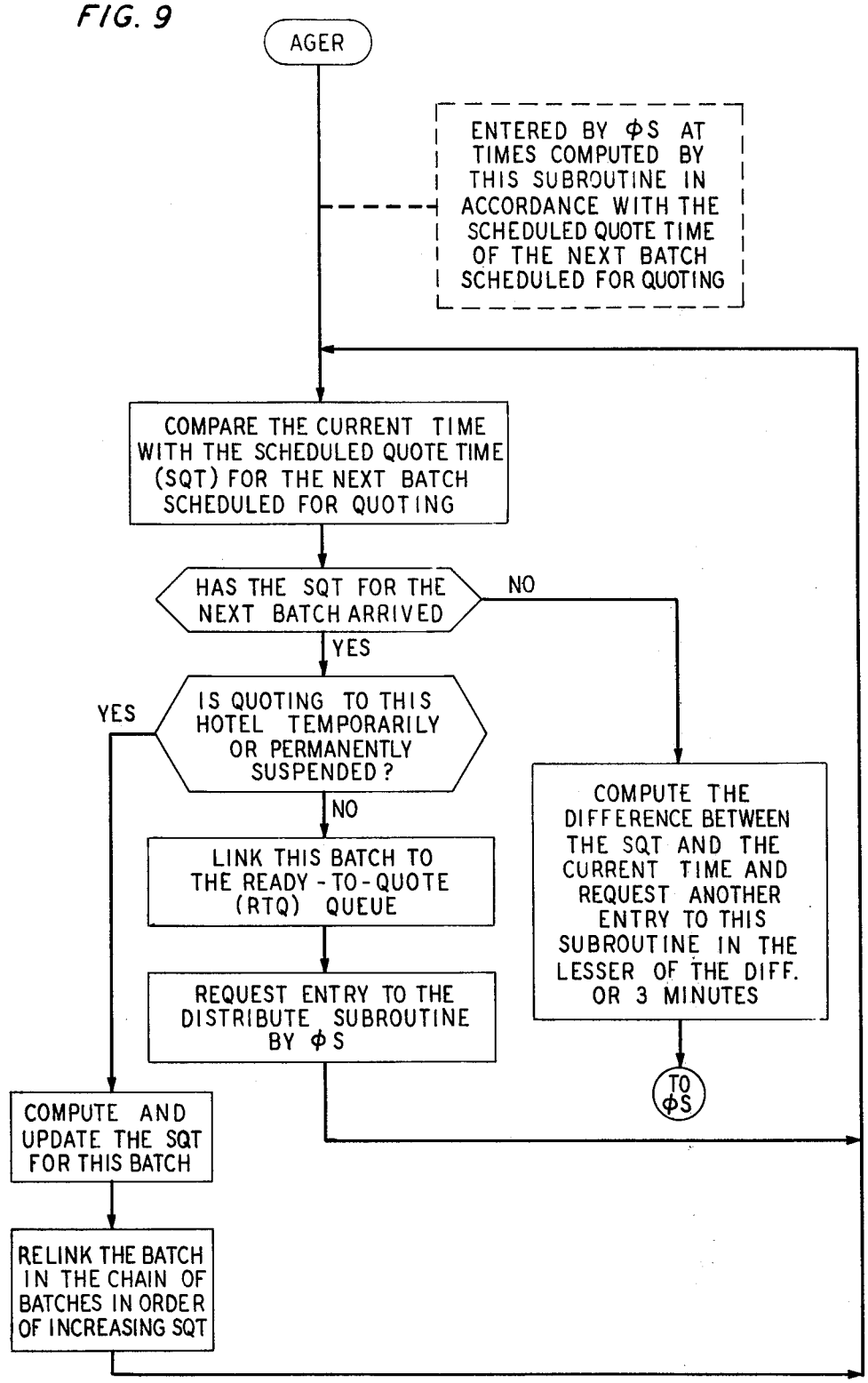
Figure 12:
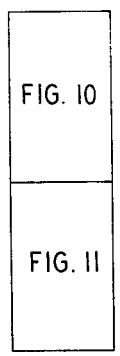
Figure 10:
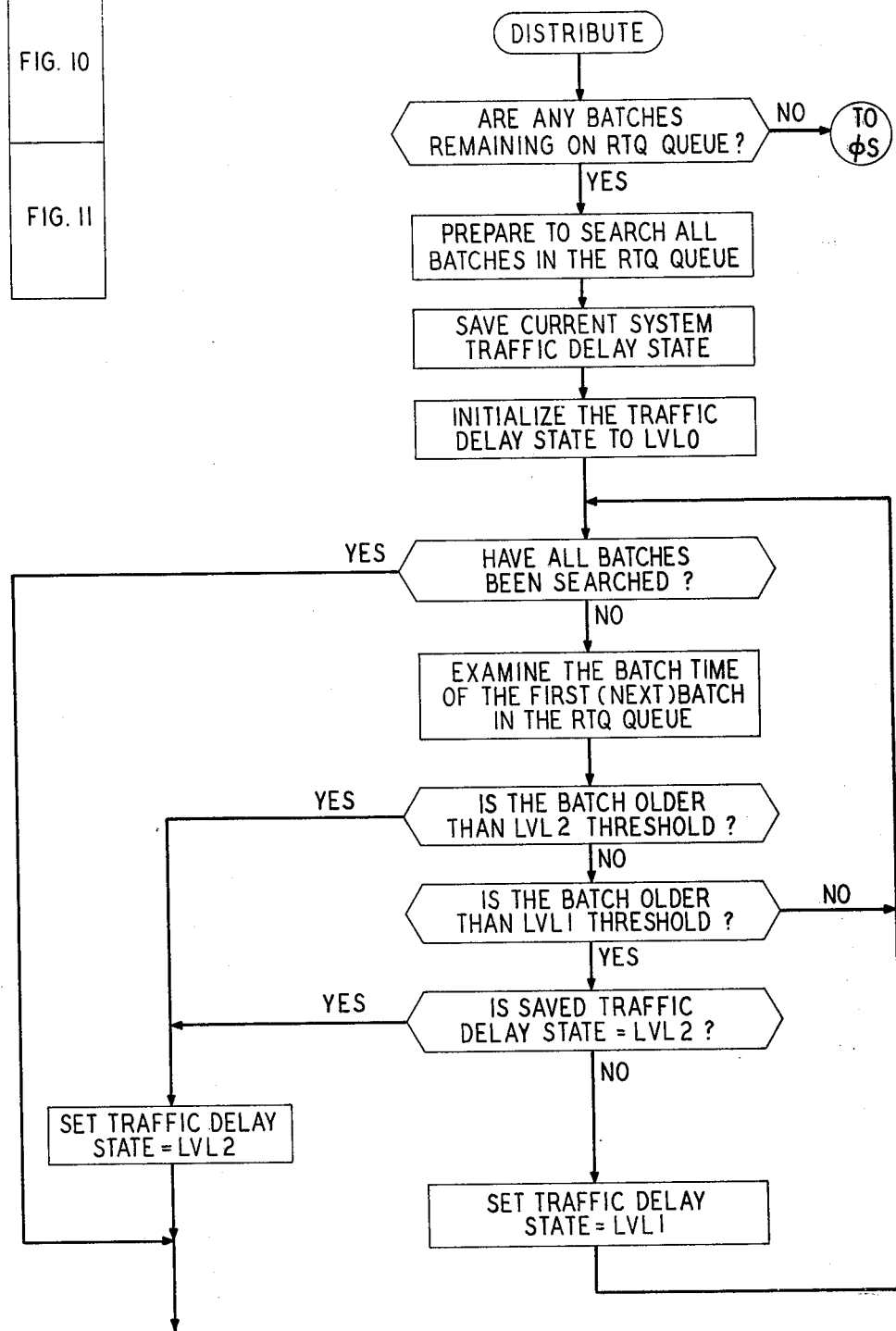
Figure 11:
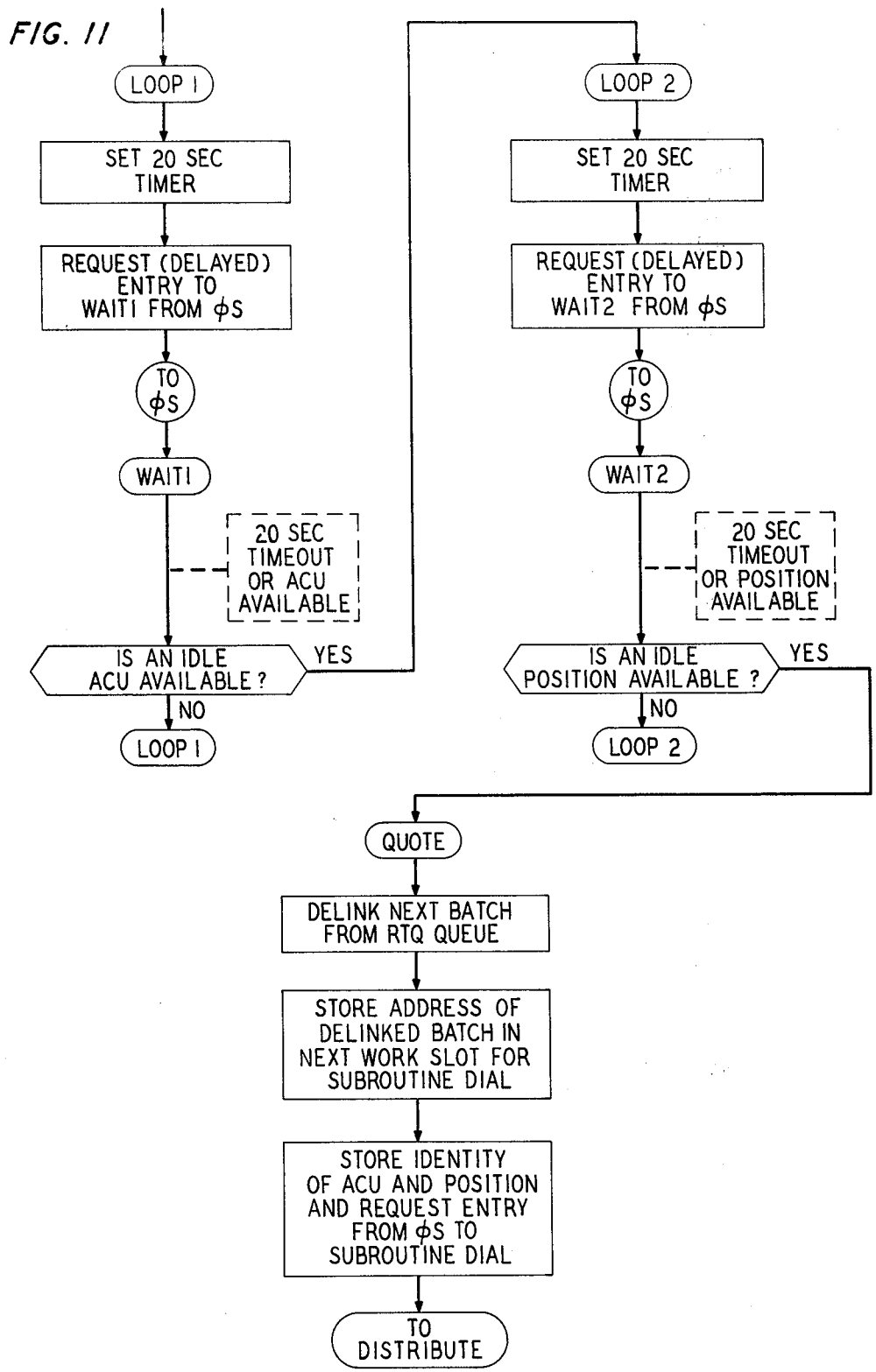
Figure 14:
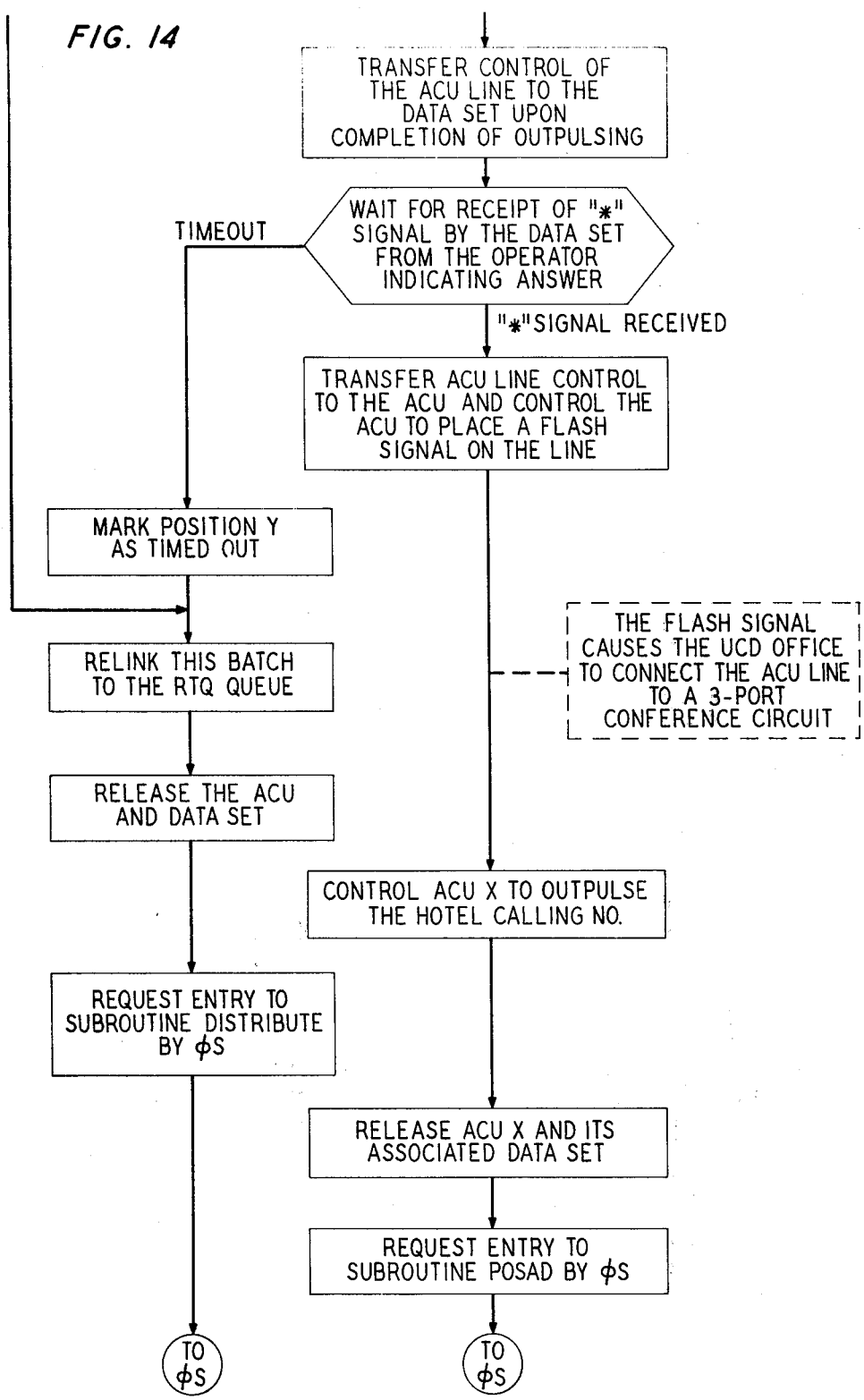

Subroutine LOGGER (FIG. 7) controls the storing of newly received call records in the HRS. Subroutine BATCHER (FIG. 8) controls the linking of records stored in the HRS to the batch list for aging before quotation. Subroutine AGER (FIG. 9) is entered at periodic intervals to determine if the scheduled quote time of any batch in the batch list has arrived and, if so, the subroutine controls the linking of the batch to a ready-to-quote queue. The DISTRIBUTE subroutine (FIGS. 10–12) is called after a batch is linked to the ready-to-quote queue and ascertains the traffic delay level of the systems. As will be seen, this is based upon the age of the oldest batch in the ready-to-quote queue. DISTRIBUTE requests execution of subroutine DIAL (FIGS. 13–15), which controls the seizure of an operator position and the automatic calling of the hotel to be quoted.

Each of the above subroutines are called at appropriate times by a HOBIS operating system (OS). An OS is a collection of control programs which control the overall software and input/output operations of a computer system. In particular, an OS is usually a permanent resident in a computer system memory and operates to control allocation of the computer system resources, to schedule user tasks according to the requests of users, to allocate and control memory space for user programs, data files and the like. Operating systems are well understood. A good discussion of operating systems is found in *Operating Systems — A Systematic View*, by W. S. Davis, Addison-Wesley Publishing Co., Inc., 1977. In particular, computer 11 of FIG. 1 uses a UNIX (trademark of Bell Telephone Laboratories, Inc.) operating system, Version PC 1C300, to control the operations of HOBIS and in particular to sequence the subroutines disclosed in FIGS. 4 through 15. This particular version of UNIX is modified in a straight-forward manner to add a control program compatible with the specific ACU 15 selected for HOBIS 10. The UNIX operating system is available by license through Bell Telephone Laboratories, Inc. and is briefly described in *Communications of the AMC*, Volume 17, Number 7 (July 1974) at 365. It is not necessary, however, that the UNIX operating system be used to implement HOBIS 10. Any person skilled in the art is readily able to adapt the program structure disclosed herein to other operating systems commercially available from computer system manufacturers, and a discussion of the detailed operations of the HOBIS OS is not necessary for an understanding of the HOBIS system or of the invention. Accordingly, the OS is discussed only to the extent necessary to explain the operation of the system.

I turn now to a discussion of the interrelated position handling subroutines LOGON and POSAD in FIGS. 4–6. LOGON is entered by the OS upon receipt of a log-on command on one of the data links 21 typed by an operator at a position terminal when the position is first occupied. POSAD on the other hand, is entered by the OS as a result of a request by the DIAL subroutine, to be discussed, to execute a voice quotation, or in response to other commands received from an operator at a position. These subroutines control and administer the "unoccupied," "idle" and "busy" states of positions as well as the states of the position availability control leads 16. With respect to "busy" position states, these subroutines call on other interactive subprograms, which are not discussed in detail, to control displays at position display terminals and to otherwise control communications between the positions and computer 11 by means of data links 21.

There are six fundamental states defined for each position. A position is in state 0 (LOGOFF) when unoccupied. An occupied position not engaged in any activity and available for quotation calls, inquiry calls, or other tasks, is in state 1 (IDLE). Two "busy" states of a position are the voice-quote state 2 (VQ) and the inquiry state 3 (NQ). In the VQ state, computer 11 displays quotation information to the operator at the display terminal of a position by means of one of data links 21. The operator quotes the information to a hotel attendant by means of a telephone connection through office 1 set up by computer 11. The NQ state is entered upon command received from an operator on one of the data links 21 after the operator receives a call from a hotel attendant or guest by means of the call distribution feature of office 1. While in the NQ state, the operator may receive information from the attendant or guest pertaining to a prior call, such as the hotel from which the call originated, room number, time of call, etc. This information is inputted to computer 11 on one of the data links 21 and computer 11 uses it to search the HRS for the record pertaining to the call. When found, the data is displayed on the position display terminal and the operator may answer questions about the data, and modify or correct it in the HRS.

The other "busy" states are the add state 4 (ADD) and callback state 5 (CB). In the ADD state, an operator may add new records to the HRS file by inputting the record data to computer 11 with the position terminal. In the CB state, an operator may perform quotations to a hotel attendant from a call-back list in response to a call from the attendant. Records are linked to the call-back list under control of the operator when, on an automatic quotation call, the attendant cannot receive the quotation and indicates that he or she will call back later to receive it.

Each of these states is associated with separate branches of program exemplified in FIG. 5 in the common portion of subroutine LOGON and POSAD designated as NXST. The placing of any position in these states is controlled by primary commands inputted by operators at the positions and received by means of data link 21, or by a request from subroutine DIAL to execute an automatic quote. Secondary commands may be received by computer 11 on data links 21 from any position while it is in one of the "busy" states 2 through 5. The secondary commands, however, are handled within the subprograms associated with the fundamental position states and do not result in a state change of a position. For example, a position in the VQ state may input a command to erase a voice quotation display and to display other quotations for a hotel which could not, because of physical display limitations, be included in the original display. Such a command, however, does not result in a state change of the position out of the VQ state.

Computer 11 maintains ones of the control leads 16 associated with unoccupied HOBIS positions activated to prevent office 1 from completing to them any calls directed to the general directory number of the group. When an operator first occupies an unoccupied position and types in the log-on command, the OS enters subroutine LOGON with the position number as an input parameter. LOGON sets the position state of the position to state 1 (IDLE). Next, at program point NSXT, the state of the position is ascertained and used to form a transfer address to the appropriate program branch associated with the state. In this case, that program branch corresponding to the IDLE state 1 is executed. The IDLE branch first clears the display terminal associated with the position and then ascertains the traffic delay level of the system determined by the DISTRIBUTE subroutine discussed below. The purpose is to determine whether to activate or deactivate the control lead 16 associated with this position. If the traffic delay level of the system is level 2, indicating that significant service delays have been occurring, no further action is taken by the IDLE branch since the control lead 16 for this position is already activated as a result of the prior unoccupied state of the position. The IDLE branch merely exits to the OS to await the generation of a quotation call to that position or the receipt of a command from the position. Since the position is marked unavailable, no inquiry calls will be directed to the position by office 1.

Assuming that the traffic delay level was level 1, indicating that some minor service delays have been recently occurring, the IDLE branch determines if the last state of the position was 3 (NQ). If so, according to a feature of the invention, the position is not allowed to receive another inquiry call before serving at least 1 quotation call. Therefore, the IDLE branch merely exits to the OS without deactivating the unavailable control signal. For a system occupancy level of 0, or 1 if the last state of the position was not NQ, the IDLE branch deactivates the unavailable signal on control lead 16 associated with the position to allow free access to the position.

The remaining portions of the subroutines in FIGS. 5-6 will be discussed at appropriate points below. With reference now to the other subroutines in FIGS. 7 to 15, the OS controls the receipt of a call record by one of the data sets 18 in FIG. 1 from a record line 9-1 and calls subroutine LOGGER in FIG. 7 to store the record in the HRS. LOGGER translates the hotel directory number or acronym received as part of the record into the hotel identification number. LOGGER interrogates the HRS-HC in FIG. 2 associated with this hotel identification number to determine if an HRS list already exists in memory for the hotel. If the link words in the HRS-HC contain the value 0, an HRS list does not yet exist. This causes LOGGER to allocate a block from the common pool of HRS blocks in order to begin a list for the hotel. LOGGER stores the record data into the first record slot of the block. In addition, it stores the appropriate information in the HEADER portion of the HRS and updates the linking information in HRS-HC.

If an HRS list already exists for the hotel, LOGGER stores the record data in the next available record location of the last HRS block in the list; if all the record locations of that block are filled, it allocates a new block from the common pool and links it to the last HRS block in the list.

LOGGER next determines by examining the record data received whether or not this record is an auto-quote record for which quoting by HOBIS is unnecessary. If so, further processing of the record is disregarded. Otherwise, the record is either a voice-quote or rerouted auto-quote record which must be batched for future quotation. In this event, LOGGER stores the hotel identification number and the HRS address of the record in an appropriate place for subroutine BATCHER and requests an entry to subroutine BATCHER by the OS.

Figure 8:
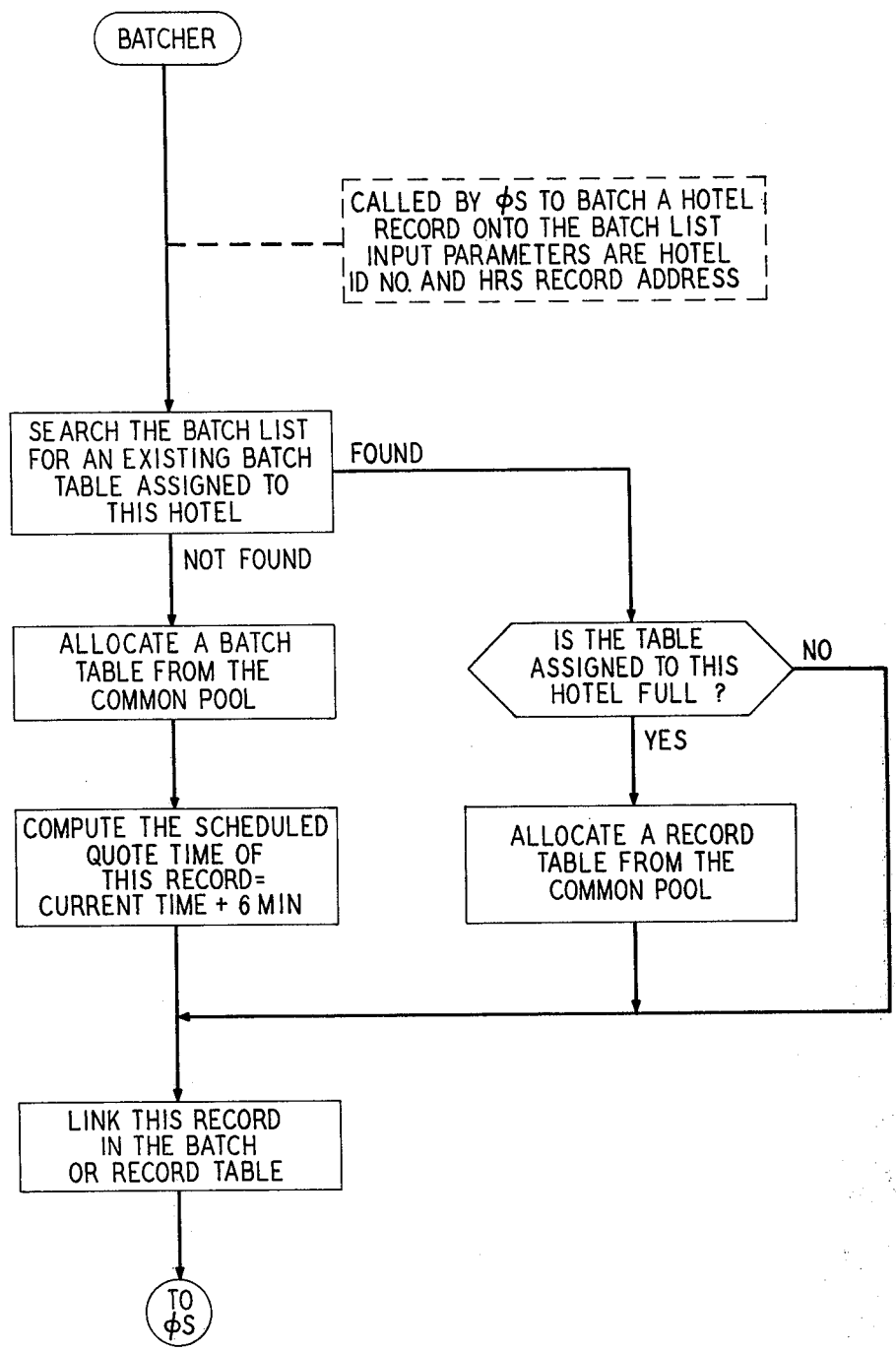

The OS enters subroutine BATCHER (FIG. 8) at its first appropriate opportunity to link the record to the batch list. The hotel identification number and the HRS address of the record stored by LOGGER are received as input parameters. With reference to FIGS. 3 and 8, BATCHER obtains from the batch list head cell (BL-HC) the address of the first batch table in the list. It then examines each table of the list to determine if a batch table for this hotel is already present. If not, BATCHER allocates a table from the common pool of batch tables. It then computes the scheduled quote time of the new record, illustratively 6 minutes after receipt of the record, and stores it in the appropriate word of the allocated table. Thus, the scheduled quote time of this first record of the batch is the scheduled quote time of the batch.

If a quotation is already scheduled to the hotel, i.e., a table for the hotel is present in the batch list, the record is simply linked to that batch table. This is accomplished by storing the HRS address of the record in the first available record pointer word in the batch table, or in a record table if a record table is linked to the batch table. If no pointer words are available in the batch or record table, BATCHER allocates a table from the common pool of record tables and links it to the list for that hotel as shown by the illustrative batch for hotel X in FIG. 3.

New records are linked into the batch list as above described until they are quoted. At or after the scheduled quote time of a hotel, subroutine AGER (FIG. 9) initiates operations for quotation of the batch to the hotel. AGER is entered by the OS at periodic intervals to determine if the scheduled quote time of the oldest (first) batch in the batch list has arrived. Upon entrance, AGER interrogates the scheduled quote time of the first batch table and compares it to the current time. If the scheduled quote time has not yet arrived, AGER computes the difference between the scheduled quote time and the current time and requests another entry from the OS after a delay of the time difference or three minutes, whichever is smaller. It then exits.

If the scheduled quote time of the first batch has arrived, AGER interrogates hotel parameter data to determine if quoting to the hotel is temporarily or permanently suspended. This might occur, for example, if a hotel, which ordinarily receives quotations at all hours of the day, has a shortage of personnel and is temporarily unable to receive quotations. In this event, AGER computes a new scheduled quote time and stores it in the batch table. Since the batch list is time-ordered according to the scheduled quote times of the batches stored therein, the rescheduling of the batch may require relinking the batch in the batch list to maintain the proper order. Thus, if the rescheduled quote time for the hotel X batch in FIG. 3, for example, falls between that for batch Y and Z, AGER updates the link words of the batch list head cell BL-HC to point to the batch table for hotel Y as the first table in the list and it updates words 0 of the batch tables for hotels Y and X to point respectively to the batch tables of hotels X and Z.

Assuming, however, that quoting to the hotel is not suspended, AGER delinks the batch from the batch list and links it to a ready-to-quote queue (not shown). The ready-to-quote queue has a format identical to that of the batch list as exemplified in FIG. 3, except that batches are not necessarily linked in time-order. Subroutine AGER requests entry to the subroutine DISTRIBUTE from the OS to begin the administration of the ready-to-quote queue. It then repeats the above operations with respect to the new batch list to determine if the scheduled quote time for the next batch (now the first batch on the list) has arrived. When all batches ready for quotation have been linked to the ready-to-quote queue, AGER exits after requesting a re-entry from the OS as described above.

Upon entry, the subroutine DISTRIBUTE (FIGS. 10–12) initially updates the current system traffic delay level in accordance with the age of the oldest batch linked in the ready-to-quote queue. According to a feature of the invention already described, this system level is used by subroutine LOGON and POSAD in FIGS. 4–6 to control the states of the control leads 16 (FIG. 1). DISTRIBUTE first saves the current system traffic delay level for later comparison and initializes the memory word containing the current traffic delay level to level 0 preparatory to leaving it in that state if the age of the oldest batch in the ready-to-quote queue warrants. The subroutine then examines in succession the age of each batch in the queue. With respect to each batch, DISTRIBUTE determines if it is older than a prescribed interval, illustratively 9 minutes and 45 seconds. If so, the subroutine sets the traffic delay level to level 2 and goes on to locate an idle automatic calling unit (ACU) and operator position to be used in performing the quotation. If the batch being examined is not older than the prescribed time interval, and is also not older than a second prescribed time interval, illustratively 8 minutes and 45 seconds, DISTRIBUTE proceeds to the next successive batch, if any, in the queue. If the batch, however, is older than the second prescribed interval, the last system occupancy level is examined to see if it is level 2. If so, the system occupancy level is also set to level 2 and the subroutine proceeds to locate an idle ACU and position as above. If the batch being interrogated is older than the second prescribed interval and the last occupancy level is not level 2, DISTRIBUTE sets the occupancy level to level 1. The subroutine then examines the next batch in the ready-to-quote queue since its age may result in the occupancy level being set to the highest level, level 2. The age of a batch on the ready-to-quote queue is determined by subtracting from the current time the scheduled time of quoting of the batch stored in word 5 of the batch tables (see FIG. 3) and adding to the result the time (illustratively 6 minutes) that the batch aged on the batch list before being placed on the ready-to-quote queue.

To summarize the foregoing, if any batch in the ready-to-quote queue is older than an illustrative period of 9 minutes and 45 seconds, indicating significant service delay, the traffic delay level is set to the highest level 2 in which positions are successively marked unavailable for receiving inquiry calls as the positions each complete tasks. If the age of any batch is no greater than an illustrative 8 minutes and 45 seconds, the level is set to level 0 in which quotation calls and inquiry calls are treated identically with respect to preferential treatment. If neither of these conditions prevail, the level is kept at 2 if already at 2 and set to 1 otherwise. As described with respect to FIGS. 4–6, this causes the control leads 16 associated with occupied operator positions to be controlled to prevent the completion of 2 or more successive inquiry calls to any position by office 1.

When the traffic delay level of the system has been set, DISTRIBUTE attempts, as mentioned, to locate an idle ACU. If none is available, DISTRIBUTE waits for one to become available by looping between the OS and entry point WAIT1. At each entry to WAIT1 an inquiry is made as to the availability of an idle ACU. This process continues until an idle ACU is found.

When an idle ACU is found, DISTRIBUTE looks for an idle HOBIS position. If an idle position is not available, provisions are also made (at LOOP2 and WAIT2) to wait further for an idle position.

Once both an idle ACU and position are available, DISTRIBUTE, at entry point QUOTE, delinks the next batch from the ready-to-quote queue and stores the HRS address of the delinked batch in an appropriate place to be read by the subroutine DIAL. The idle ACU and position numbers are also stored for DIAL and an entry requested to that subroutine. DISTRIBUTE is then reexecuted with respect to the new ready-to-quote queue.

As a result of the operations of DISTRIBUTE, DIAL is subsequently entered, with the idle ACU and position numbers stored by DISTRIBUTE as input parameters, to control the connection of the position to the hotel to receive the quotation. First, the digits to be outpulsed to office 1 to seize the idle position are determined. These in turn depend upon the system traffic delay level which determines whether or not the override feature of office 1 is to be used. In the event the traffic delay level is 0, speed-calling is used to seize the position. Specifically, two digits followed by a termination signal are outpulsed to office 1, identifying the idle position. If the traffic delay level is not 0, the control lead 16 associated with the position may be activated. Therefore, subroutine DIAL sets the digits to be outpulsed equal to the override code, followed by a 4 digit position directory number.

DIAL now forms the calling number of the hotel. It also seizes the idle ACU 15 and the data set 14 shown in FIG. 1 associated therewith. Seizure of the ACU causes a seizure of the associated line 13 to the office 1. DIAL waits for the return of dial tone from office 1 to the ACU 15 responsive to the line seizure. If dial tone is not returned within a prescribed time interval, DIAL assumes that a malfunction has occurred in the office and, as a result, it relinks the batch to be quoted to the ready-to-quote queue. It releases the ACU 15 and its data set 14, schedules DISTRIBUTE, and returns to the OS. The quotation of the batch is retried by DISTRIBUTE according to the sequence described earlier. Assuming that dial tone is received within the prescribed time interval, however, DIAL controls ACU 15 to outpulse the digits previously setup to seize the position via its line of hunt group 11. At the completion of outpulsing, control of the line 13 is transferred from ACU 15 to the associated data set 14. At the time of seizure of the data set, DIAL causes the data set to generate a tone signal which is now applied to the line. The tone alerts the operator upon answer that a quotation call initiated by computer 11 is in progress, rather than an inquiry call from a hotel attendant. The operator responds to the tone by depressing the "*" key at the position keyset and a signal corresponding thereto is returned over the line 11 and office 1 to a signal receiver in data set 14. DIAL waits for the receipt of this signal before proceeding further. If the signal is not received within a predetermined time interval it is assumed that a malfunction has occurred. The batch to be quoted is re-linked to the ready-to-quote queue, the ACU 15 and data set 14 are released and the DISTRIBUTE subroutine is requested to reattempt quotations to the hotel.

Assuming that events proceed normally, however, and that the "*" signal is received by data set 14, DIAL transfers control of line 13 to ACT 15 and controls the ACU to place a "flash" signal on the line. The "flash" signal causes office 1 to connect a three-port conference circuit to line 13 and again to return dial tone. Subroutine DIAL immediately proceeds to control the outpulsing of the hotel directory number by ACU 15. This means, of course, that if a malfunction occurs and dial tone is not returned, the call to the hotel is not properly completed. In the event of such a malfunction, the operator at the seized position may manually redial the hotel in order to make the quotation. ACU 15 and data set 14 are released by DIAL after outpulsing and an entry is requested from the OS to subroutine POSAD in FIG. 4.

Assume now that a voice quotation call from computer 11 is in progress and that outpulsing has occurred by subroutine DIAL to seize a position and to call the hotel to receive the quotation. An entry is made to POSAD in FIG. 4 from the OS as a result of a request by DIAL. POSAD first activates the associated control lead 16 for the position. This signal will be left activated or deactivated, in accordance with the algorithm already described, by the IDLE branch of NXST when the position again becomes idle. POSAD next determines whether the entry was due to a quotation request from subroutine DIAL or to a command from an operator position. Since the entry was due to a request from DIAL, POSAD sets the position state for the position to the voice-quote (VQ) state and enters NXST where a transfer is made to the state 2 (VQ) program branch. This branch calls a VQ subprogram to administer communications with the position while in the voice-quote state. The VQ subprogram is interactive. That is, it controls the display of voice quote information at the display terminal of the position and interacts with secondary commands received from the operator. Once in the VQ state, the position remains there until a primary command, such as NQ, IDLE, ADD, CB, or LOGOFF occurs, at which time the VQ subprogram returns to the VQ branch in FIG. 5. The position state is set equal to the primary command received and transfer is then made to NXST where the program branch associated with the new command is executed.

Similar operations as above occur for the NQ, ADD, and CB states. That is, the appropriate subprogram is called by NXST to control communications with the position. These states are thus not discussed in any further detail. Upon receipt of a log-off command, however, the LOGOFF program branch in FIG. 5 is executed and results in an activation of the control lead 16 associated with the position. This prevents office 1 from directing any inquiry calls to the position while it is onoccupied. The position is also removed from the HOBIS idle position list so that no quotation calls will be directed to it.

It is understood that the above-described arrangement is merely illustrative of the application of the principles of the invention, and that other arrangements may be devised by those skilled in the art without departing from the spirit and scope of the invention.

I claim:

1. In a telephone system (FIG. 1), a method of obtaining preferential access to a plurality of positions (12) for a first type of call, wherein idle available ones of the positions are accessible for calls of the first and a second type and unavailable ones of the positions are accessible for test calls, said method being characterized by the steps of
   first, marking a selected available one of the positions unavailable after termination of a call of the second type to the selected position,
   second, accessing the selected position for a prescribed number of calls of the first type while it is marked unavailable by overriding the unavailable condition,
   third, marking the selected position available after completion of the prescribed number of calls of the first type to the selected position.

2. A method of preferentially accessing a group of operator positions (12) for a first type of call over a second type of call in a telephone system (FIG. 1) comprising call ditribution means (1) responsive to calls of the first and second types for accessing idle available ones of the positions and controllable for accessing an unavailable one of the positions in response to a test call, a plurality of control appearances (7) at the distribution means individually associated with different ones of the positions and to which signals are applied for alerting the distribution means of the available and unavailable status of the positions, said method being characterized by the steps of
   first, marking a selected available one of the positions unavailable at its associated control appearance at the distribution means after the termination of a call of the second type to the selected position,
   second, controlling the distribution means to access the selected position at least once for a first type of call while the selected position is marked unavailable by overriding the unavailable condition, and
   third, after accessing the selected position at least once, marking the selected position available at its associated control appearance.

3. The invention of claim 2 wherein the first marking step includes the steps of
   detecting the termination of a call of the second type to one of the positions, and
   activating a position unavailable signal at one of the control appearances associated with the last-mentioned one of the positions responsive to a first prescribed delay condition in accessing the positions for calls of the first type.

4. The invention of claim 2 further characterized by the step of
   activating a position unavailable signal at the associated control appearance (7) of a second one of the positions responsive to a first prescribed delay condition in accessing the positions for calls of the first type, and deactivating the unavailable signal associated with the last-mentioned position responsive to a second prescribed delay condition in accessing the positions for calls of the first type.

5. The invention of claim 2 further characterized by the step of
   activating the position unavailable signals associated with all occupied ones of the positions responsive to a first prescribed delay condition in accessing the positions for calls of the first type.

6. The invention of claim 5 further characterized by the step of deactivating the position unavailable signals associated with all occupied ones of the positions responsive to a second prescribed delay condition in accessing the positions for calls of the first type.

7. A method of preferentially accessing a group of positions (12) for a first type of call over a second type of call in a telephone system (FIG. 1) comprising call distribution means (1) for accessing an idle available one of the positions in response to receipt of a call of the second type directed to a general directory number of the group of positions or for accessing an unavailable one of the positions in response to receipt of an override code accompanied by a directory number uniquely identifying the unavailable position, said method being characterized by the steps of marking a selected idle available one of the positions unavailable to the distribution means, placing a prescribed number of calls of the first type to the selected position while marked unavailable by outpulsing to the distribution means the override code accompanied by the unique directory number of the selected position, and removing the unavailable condition of the selected position after completing the prescribed number of calls of the first type to the selected position.

8. A method of preferentially accessing a group of positions (12) for calls initiated by a computer (11) over noncomputer calls in a telephone system (FIG. 1) comprising call distribution means (1) having control appearances (7) individually associated with different ones of the positions and to which signals are applied for marking the positions available or unavailable for receiving calls, wherein the distribution means is operative for accessing an idle available one of the positions responsive to receipt of a general directory number identifying the group of positions, and means for accessing an unavailable one of the positions responsive to a test call identified by receipt of an override number accompanied by a directory number uniquely identifying the unavailable position, characterized by the steps controlled by the computer of applying an unavailable signal to one of the control appearances associated with a selected one of the positions at the termination of a noncomputer call to the selected position, calling the selected position a prescribed number of times from the computer by outpulsing to the distribution means on each computer call the override number accompanied by the unique directory number of the selected position, and removing the unavailable signal from said one control appearance after completing the prescribed number of computer calls.

9. The method of claim 8 further characterized by the steps of successively applying unavailable signals to the control appearances associated with occupied ones of the positions in response to prescribed delays experienced by the computer in placing calls, calling ones of the made unavailable positions on succeeding computer calls by outpulsing the override number accompanied by the unique directory numbers of the unavailable positions, and removing the unavailable signals from the control appearances of occupied ones of the positions in response to other prescribed delays experienced by the computer in placing calls.

10. A method of preferentially accessing a plurality of stations (12) of a first type of call over a second type of call in a telephone system (FIG. 1) comprising call distribution means (1), (11, 17, 16, 7 operative) for marking individual ones of the stations unavailable for serving calls, wherein the distribution means is responsive to receipt of an override code for overriding an unavailable condition on said station established by said marking means to place a test call to said station, characterized by the steps of responsive to a first prescribed traffic delay condition experienced in placing calls of the first type to the stations, successively marking ones of the stations unavailable for serving calls as said ones of the stations become available for serving new calls, placing calls of the first type of said ones of the stations while said ones are marked unavailable by overriding the unavailable condition of said ones of the stations, and responsive to a second prescribed traffic delay condition experienced in placing calls of the first type to the stations, successively marking said ones of the stations available for calls as said ones of the stations become idle for serving new calls.

11. The invention of claim 10 further characterized by the steps of successively marking other ones of the stations unavailable for serving calls responsive to the completion of a call of the second type by said last-mentioned ones of the stations and to a third prescribed traffic delay condition experienced in placing calls of the first type to the stations, placing a prescribed number of calls of the first type to said last-mentioned ones of stations while they are marked unavailable by overriding the unavailable condition of said last-mentioned ones of the stations, and upon completion of the prescribed number of calls to said last-mentioned ones of the stations, successively marking each said last-mentioned one of the stations available for serving calls.

* * * * *